(12) United States Patent
Hestetun

(10) Patent No.: US 9,732,575 B2
(45) Date of Patent: Aug. 15, 2017

(54) SUBSEA ARRANGEMENT

(71) Applicant: VETCO GRAY SCANDINAVIA AS, Sandvika (NO)

(72) Inventor: Steinar Hestetun, Billingstad (NO)

(73) Assignee: Vetco Gray Scandinavia AS, Billingstad (NO)

( * ) Notice: Subject to any disclaimer, the term of this patent is extended or adjusted under 35 U.S.C. 154(b) by 78 days.

(21) Appl. No.: 14/055,381

(22) Filed: Oct. 16, 2013

(65) Prior Publication Data

US 2014/0102711 A1    Apr. 17, 2014

(30) Foreign Application Priority Data

Oct. 17, 2012  (EP) .................................... 12007174

(51) Int. Cl.
| F16L 1/00 | (2006.01) |
| E21B 33/038 | (2006.01) |
| E21B 43/01 | (2006.01) |
| F16L 1/26 | (2006.01) |
| F16L 37/00 | (2006.01) |
| F16L 37/62 | (2006.01) |

(52) U.S. Cl.
CPC ........ *E21B 33/038* (2013.01); *E21B 43/0107* (2013.01); *F16L 1/26* (2013.01); *F16L 37/002* (2013.01); *F16L 37/62* (2013.01)

(58) Field of Classification Search
CPC ....... F16L 1/12; F16L 1/16; F16L 1/26; F16L 37/002; F16L 37/62; E21B 43/0107; E21B 33/038
USPC ........................... 166/344; 405/158, 169, 170
See application file for complete search history.

(56) References Cited

U.S. PATENT DOCUMENTS 6,234,717 B1    5/2001  Corbetta
2011/0005764 A1*  1/2011  Bekkevold .................... 166/344

FOREIGN PATENT DOCUMENTS

| FR | 2552199 | 3/1985 |
| WO | 9711301 | 3/1997 |
| WO | 2004106696 | 12/2004 |
| WO | 2006005994 | 1/2006 |
| WO | 2009082240 | 7/2009 |
| WO | 2011034438 | 3/2011 |

OTHER PUBLICATIONS

EP Search Report and Written Opinion from corresponding EP Application No. 12007174.1, Dated Apr. 19, 2013.

* cited by examiner

*Primary Examiner* — Matthew R Buck
*Assistant Examiner* — Patrick Lambe
(74) *Attorney, Agent, or Firm* — GE Global Patent Opertation

(57) ABSTRACT

A subsea arrangement comprising a first subsea structure, a second subsea structure, and a clamp connector. The first subsea structure is provided with at least one coupling member which is designed to mate with a corresponding coupling member on a first side of the clamp connector so as to allow the clamp connector to be releasably connected and secured to the first subsea structure through these coupling members. The second subsea structure is provided with at least one coupling member which is designed to mate with a corresponding coupling member on an opposite second side of the clamp connector so as to allow the clamp connector to be releasably connected and secured to the second subsea structure through these coupling members.

8 Claims, 6 Drawing Sheets

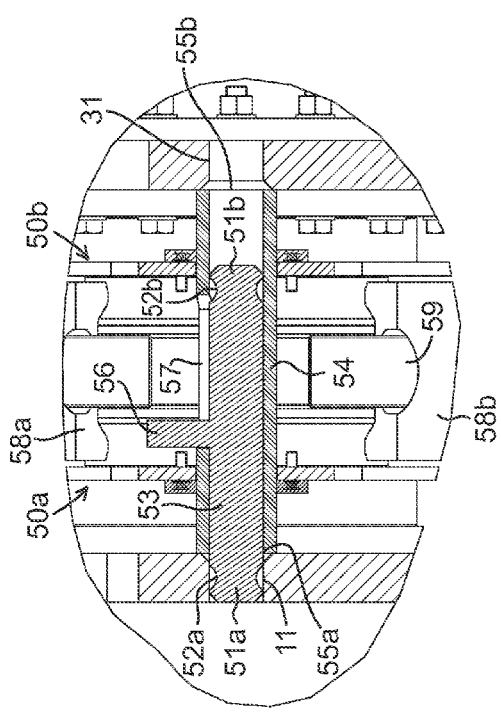
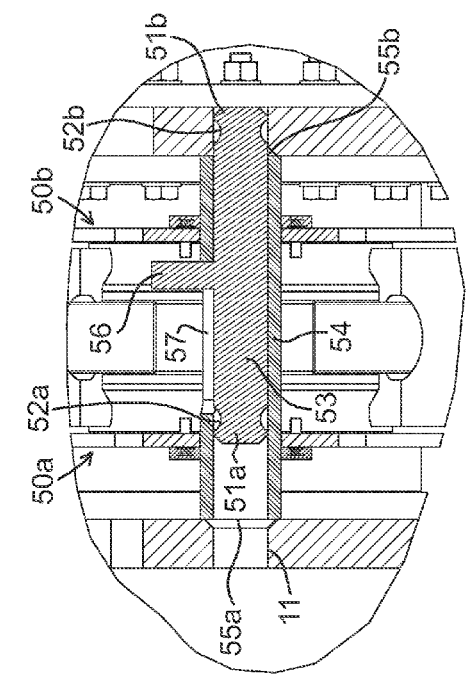
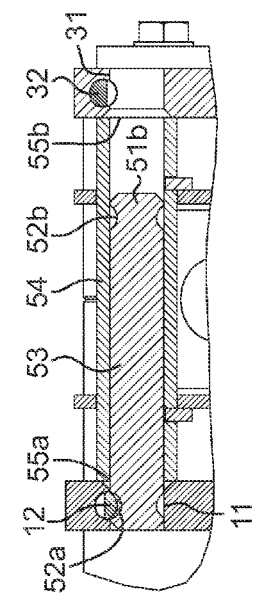
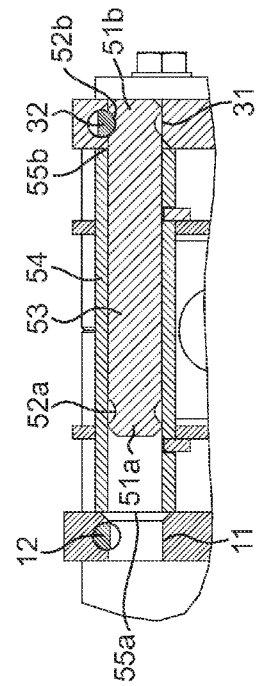
Fig 8A  Fig 8B
Fig 9A  Fig 9B

SUBSEA ARRANGEMENT

BACKGROUND OF THE INVENTION

Embodiments of the present invention relate to a subsea arrangement.

Conventional subsea arrangements are previously known from WO 2009/082240 A1 and WO 2011/034438 A1.

A conventional type of clamp connector for connecting and securing an end of a tubular member to an abutting end of another tubular member is disclosed in WO 97/11301 A1. Two arc-shaped clamping elements of this clamp connector are pivotable towards each other by rotation of a threaded operating shaft about its longitudinal axis in a first direction in order to clamp the ends of the tubular members to each other. If the ends of the tubular embers needs to be released from each other at a later occasion, the clamping elements may be pivoted away from each other by rotation of the operating shaft about its longitudinal axis in the opposite direction.

SUMMARY OF THE INVENTION

Embodiments of the present invention provide a subsea arrangement with a new and favorable design.

According to an embodiment of the present invention, there is provided a subsea arrangement.

The subsea arrangement according to an embodiment of the present invention comprises a first subsea structure, a second subsea structure, and a clamp connector for connecting and securing an end of a tubular member, that is fixed to the first subsea structure to an abutting end of another tubular member, that is fixed to the second subsea structure, the clamp connector having a first side intended to face the first subsea structure and an opposite second side intended to face the second subsea structure.

The first subsea structure is provided with at least coupling member which is designed to mate with a corresponding coupling member on the first side of the clamp connector, to allow the clamp connector to be releasably connected and secured to the first subsea structure through these coupling members. Whereas, the second subsea structure comprises at least one coupling member which is designed to mate with a corresponding coupling member on said second side of the clamp connector, to allow the clamp connector to be releasably connected and secured to the second subsea structure through these coupling members. Hereby, the clamp connector may be secured to the first subsea structure or the second subsea structure before the tubular members are connected to each other and when the tubular members are to be released from each other. Thus, if one of the subsea structures has to be retrieved to a surface vessel from a subsea installation, the clamp connector may be released from the subsea structure, that is to be retrieved, and instead secured to the other subsea structure, that is to remain at the subsea installation, or vice versa. Consequently, embodiments of the present invention offer full flexibility, with respect to the attachment of the clamp connector to the associated subsea structures, both before and after submerging the clamp connector.

Further advantages, as well as advantageous features of the subsea arrangement according to the present invention, will appear in the dependent claims and the following description.

BRIEF DESCRIPTION OF THE DRAWINGS

With reference to the appended drawings, a specific description of embodiments of the present invention cited as examples follows below. In the drawings:

FIGS. 8A and 8B are longitudinal sections in a vertical plane through coupling members included in the clamp connector and the first and second subsea structures according to embodiments of the present invention;

FIGS. 9A and 9B are longitudinal sections in a horizontal plane through the coupling members of FIGS. 8A and 8B according to embodiments of the present invention.

DETAILED DESCRIPTION OF THE EXEMPLARY EMBODIMENTS OF THE INVENTION

Figure 1:
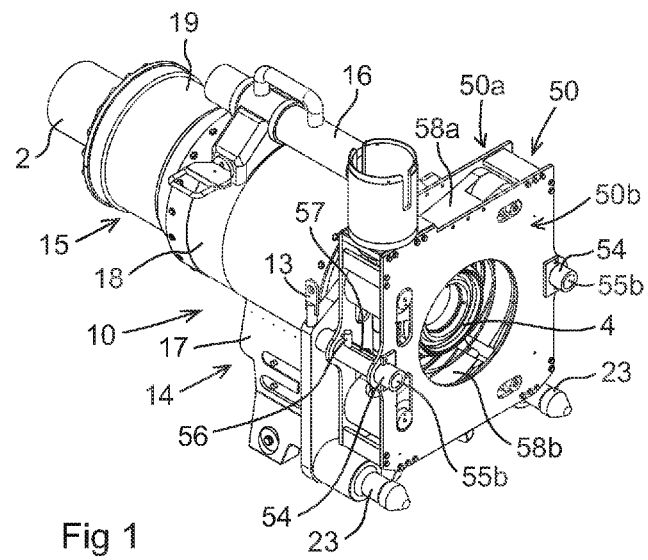
FIG. 1 is a perspective view of a clamp connector and a first subsea structure included in a subsea arrangement according to an embodiment of the present invention.
Figure 2:
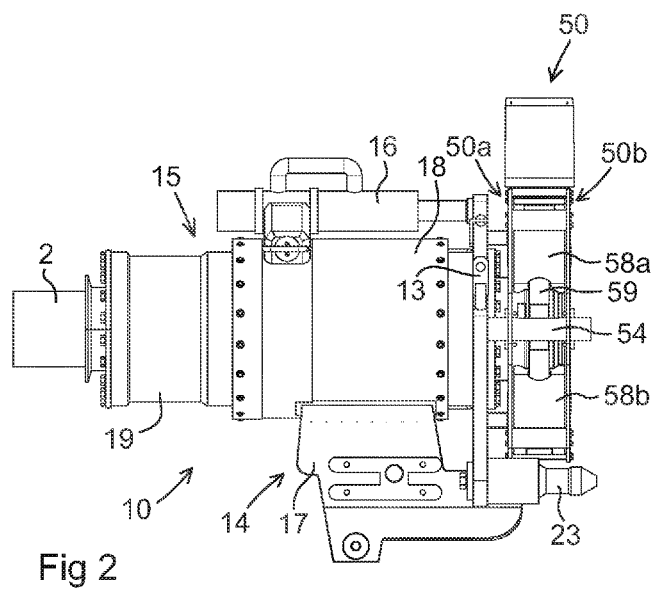
FIG. 2 is a lateral view of the clamp connector and subsea structure of FIG. 1 according to an embodiment of the present invention.

A subsea arrangement 1 according to an embodiment of the present invention is illustrated in FIGS. 1-11. The subsea arrangement 1 comprises a first subsea structure 10, a second subsea structure 30 and a clamp connector 50. The subsea arrangement 1 is to be used for connecting an end of a tubular member 2 to an abutting end of another tubular member 3. The end of a first one of the tubular members is fixed to the first subsea structure 10, whereas the end of a second one of the tubular members is fixed to the second subsea structure 30. The clamp connector 50 is used for connecting and securing the end of the first tubular member 2 to the end of the second tubular member 3. The clamp connector 50 has a first side 50a intended to face the first subsea structure 10 and an opposite second side 50b intended to face the second subsea structure 30.

The tubular members 2, 3 may, for instance, be end sections of rigid or flexible conduits of single bore or multibore type.

In an embodiment of the present invention, a first subsea structure 10 is provided with at least one coupling member 11, which is designed to mate with a corresponding coupling member 51a on the first side 50a of the clamp connector 50, so as to allow the clamp connector to be releasably connected and secured to the first subsea structure, 10 through these coupling members 11, 51a. In an embodiment that is illustrated, two such coupling members 51a are provided on the first side 50a of the clamp connector on opposite sides of a vertical central plane of the clamp connector, each one of these coupling members 51a being designed to mate with a corresponding coupling member 11 on the first subsea structure 10.

In an embodiment of the present invention, a second subsea structure 30 is provided with at least one coupling member 31 which is designed to mate with a corresponding coupling member 51*b* on the second side 50*b* of the clamp connector 50, so as to allow the clamp connector to be releasably connected and secured to the second subsea structure 30 through these coupling members 31, 51*b*. In an embodiment that is illustrated, two such coupling members 5 1b are provided on the second side 50*b* of the clamp connector on opposite sides of a vertical central plane of the clamp connector, each one of these coupling members 51*b* being designed to mate with a corresponding coupling member 31 on the second subsea structure 30.

In an embodiment, each one of the coupling members 11, 31 on the first and second subsea structures 10, 30 is a female-like coupling member, the associated coupling member 51*a*, 51*b* on the clamp connector 50 being a male-like coupling member designed to fit into the female-like coupling member 11, 31.

In an embodiment illustrated in FIGS. 8A, 8B, 9A and 9B, each male-like coupling member 51*a*, 51*b* has the form of a horizontally extending pin and is moveably mounted to the clamp connector 50, so as to be moveable between an advanced position for engagement with the associated female-like coupling member 11, 31 and a retracted position for disengagement from the associated female-like coupling member 11, 31. In the illustrated example, the male-like coupling members 51*a*, 51*b* are arranged in pairs, each pair comprising a first male-like coupling member 51*a* provided on the first side 50*a* of the clamp connector and a second male-like coupling member 51*b* provided on the second side 50*b* of the clamp connector. The two coupling members 51*a*, 51*b* in each pair are fixed to and extend in opposite directions from a body 53, which is displaceably mounted to the clamp connector 50, the body 53 being displaceable to and fro between a first position (see FIGS. 8A and 9A), in which the first male-like coupling member 51*a* is in its advanced position and the second male-like coupling member 51*b* is in its retracted position, and a second position (see FIGS. 8B and 9B), in which the second male-like coupling member 51*b* is in its advanced position and the first male-like coupling member 51*a* is in its retracted position.

The above-mentioned body 53 is slidably received in a tubular casing 54 which extends between the first and second sides 50*a*, 50*b* of the clamp connector. The first male-like coupling member 51*a* extends through an opening 55*a* at a first end of the casing 54 when it is in its advanced position and is received inside the casing 54 when it is in its retracted position, whereas the second male-like coupling member 51*b* extends through an opening 55*b* at the opposite second end of the casing 54 when it is in its advanced position and is received inside the casing 54 when it is in its retracted position. A control member 56 is fixed to the body 53 and extends through an elongated slit 57 in the casing 54, which slit 57 extends in the longitudinal direction of the casing 54. By movement of the control member 56 along the slit 57, the body 53 and the coupling members 51*a*, 51*b* are axially displaced in relation to the casing 54. The control member 56 is to be operated by means of an ROV (ROV=Remotely Operated Vehicle) or by means of a hydraulically driven actuating tool (not shown) mounted to the clamp connector 50.

Each coupling member 11 on the first subsea structure 10 is provided with a locking member 12 (see FIGS. 9A and 9B) which is engageable with a corresponding locking member 52*a* on the associated coupling member 51*a* provided on the first side 50*a* of the clamp connector in order to releasably retain these coupling members 11, 51*a* in engagement with each other. In the same manner, each coupling member 31 on the second subsea structure 30 is provided with a locking member 32, which is engageable with a corresponding locking member 52*b* on the associated coupling member 51*b* provided on the second side 50*b* of the clamp connector, in order to releasably retain these coupling members 31, 51*b* in engagement with each other.

In an embodiment, each one of the locking members 52*a*, 52*b* on the male-like coupling members 51*a*, 51*b* has the form of a recess in the associated coupling member 51*a*, 51*b*, whereas the locking members 12, 32 of the female-like coupling members 11, 31 are rotatably mounted to the first subsea structure 10 and second subsea structure 30, respectively. The locking member 12, 32 of a female-like coupling member 11, 31 is rotatable to and fro between a locking position, in which the locking member 12, 32 is in engagement with the locking member 52*a*, 52*b* of the associated male-like coupling member 51*a*, 51*b* and thereby prevents an axial displacement of the male-like coupling member, and an unlocking position, in which the locking member 12, 32 is out of engagement with the locking member 52*a*, 52*b* of the associated male-like coupling member 51*a*, 51*b* and thereby allows an axial displacement of the male-like coupling member. Each locking member 12, 32 is connected to a handle 13, 33, by means of which the locking member 12, 32 may be rotated between the locking and unlocking positions. The handles 13, 33 are to be operated by means of an ROY (ROV=Remotely Operated Vehicle).

The coupling members 11, 31, 51*a*, 51*b* and the locking members 12, 32, 52*a*, 52*b* may of course also have other designs than here illustrated.

The clamp connector 50 comprises three arc-shaped clamping elements 58A, 58*b*, 58*c*, which are configured to clamp together a hub 4 provided at the end of the first tubular member 2 with a corresponding hub 5 provided at the end of the second tubular member 3 in order to form a fluid-tight connection between the two tubular members. The clamping elements 58*a*, 58*b*, 58*c* may be designed and operated in a conventional manner well known to a person skilled in the art. A space for receiving the ends of two tubular members 2, 3 to be connected to each other is formed between the clamping elements 58*a*, 58*b*, 58*c*, Two clamping elements 58*a*, 58*b* have a hinged first end and an opposite second end. An operating shaft 59 is connected to the last-mentioned clamping elements 58*a*, 58*b*, the operating shaft 59 being moveable by means of a remotely operated actuating tool (not shown) in order to move the second ends of the clamping elements 58*a*, 58*b* towards each other and thereby pivot the clamping elements into engagement with the hubs 4, 5 provided at the ends of the tubular members 2, 3. The actuating tool may be detachably mounted to the clamp connector 50.

The operating shaft 59 is, in an embodiment, an externally threaded shaft which is in threaded engagement with an internally threaded first trunnion member (not shown) pivotally mounted to the first clamping element 58*a* at the second end thereof and with an internally threaded second trunnion member (not shown) pivotally mounted to the second clamping element 58*b* at the second end thereof. In this case, the actuating tool is a torque tool configured to rotate the operating shaft 59 about its longitudinal axis in a first direction in order to pivot the clamping elements 58*a*, 58*b*, 58*c* towards the hubs 4, 5 and in the opposite direction in order to pivot the clamping elements 58*a*, 58*b*, 58*c* away from the hubs 4, 5.

Each clamping element 58*a*, 58*b*, 58*c* has opposed bevelled wedging surfaces 60*a*, 60*b* (see FIG. 7) for engaging corresponding bevelled wedging surfaces 6*a*, 6*b* provided on the hubs 4, 5 of the tubular members 2, 3 to be connected to each other. The clamping elements 58a, 58b, 58c are moveable to and fro between an open position (see FIG. 7) and a closed position under the effect of the operating shaft 59. In the closed position, the clamping elements 58a, 58b, 58c are pivoted towards each other and the wedging surfaces 60a, 60b of the clamping elements 58a, 58b, 58c are in engagement with the corresponding wedging surfaces 6a, 6b of the tubular members 2, 3 and thereby keep the ends of the tubular members tightly clamped to each other. In the open position, the clamping elements 58a, 58b, 58c are pivoted away from each other and do not exert any clamping action on the ends of the tubular members 2, 3.

In an embodiment, the first subsea structure 10 comprises a base unit 14 and a sliding unit 15, which is slidably mounted to the base unit 14. The end section of the first tubular member 2 is fixed to the sliding unit 15. A stroking device 16 in the form of a hydraulic cylinder is configured to act between the base unit 14 and the sliding unit 15. The sliding unit 15 and the end section of the first tubular member 2 can be pushed axially forwards in relation to the base unit 14 by means of the stroking device 16. The base unit 14 comprises a lower base frame 17 and a support sleeve 18 mounted to the base frame 17, whereas the sliding unit 15 comprises a tubular body 19. The tubular body 19 is configured to surround the end section of the first tubular member 2 and is displaceably received in the support sleeve 18. The tubular body 19 extends through the support sleeve 18 and is axially displaceable in relation to the support sleeve 18 by means of the stroking device 16. The end section of the first tubular member 2 extends through and is fixed to the tubular body 19. Thus, the end section of the first tubular member 2 will be axially displaced together with the tubular body 19 when the tubular body is displaced in relation to the support sleeve 18. The stroking device 16 is configured to act between the support sleeve 18 and the tubular body 19.

In an embodiment, the second subsea structure 30 comprises a horizontally extending base frame 34 and a holding unit 35 rigidly connected to the base frame 34. The end section of the second tubular member 3 is fixed to a holding plate 36 included in the holding unit 35. This holding plate 36 is mounted to the base frame 34 and extends in a vertical direction from the base frame.

The base unit 14 of the first subsea structure 10 is connectable to the base frame 34 of the second subsea structure 30 by being lowered downwards onto the base frame 34 so as to come to bear against it. Thus, the base frame 34 of the second subsea structure 30 constitutes a landing platform for the first subsea structure 10. The base unit 14 of the first subsea structure 10 is provided with guiding means 20, 21, 22a, 22b configured to co-operate with corresponding guiding means 40, 41, 42a, 42b on the second subsea structure 30 so as to guide the base unit 14 into a correct position in relation to the base frame 34 when the base unit 14 is lowered downwards into contact with the base frame 34.

In an embodiment, the guiding means of the base unit 14 comprise a ring-shaped guide member 20, which is mounted to the base frame 17 of the base unit 14, so as to project in a horizontal direction therefrom. This guide member 20 is configured to engage with a guide member in the form of a vertically extending guide post 40 detachably mounted to the base frame 34 of the second subsea structure 30. The guide member 20 is to pass over the top of the guide post 40 when the first subsea structure 10 is lowered towards the second subsea structure 30 and then slide downwards along the guide post until the base unit 14 of the first subsea structure 10 makes contact with the base frame 34 of the second subsea structure 30.

In an embodiment, the guiding means of the base unit 14 further comprise an elongated and horizontally extending guide member in the form of a guide rod 21, which extends perpendicularly to the longitudinal axis of the base unit 14. This guide rod 21 is mounted to the base frame 17 of the base unit 14 on the underside thereof and is configured to come into engagement with a corresponding elongated and horizontally extending guide member in the form of a guide groove 41 on the base frame 34 of the second subsea structure 30 when the base unit 14 of the first subsea structure 10 is lowered downwards into contact with the base frame 34 of the second subsea structure.

In an embodiment, the guiding means of the base unit 14 also comprise two guide members in the form of vertical guide plates 22a, 22b, which extend in the longitudinal direction of the base unit 14. These guide plates 22a, 22b are mounted to the base frame 17 of the base unit 14 and project from the underside thereof. The guide plates 22a, 22b are configured to come into engagement with vertical guide surfaces 42a, 42b on the base frame 34 of the second subsea structure 30, when the base unit 14 of the first subsea structure is lowered downwards into contact with the base frame 34 of the second subsea structure.

The second subsea structure 30 and the sliding unit 15 of the first subsea structure 10 are provided with corresponding alignment members 23, 43, which are configured to come into contact with each other in order to align the end of the first tubular member 2 with the end of the second tubular member 3 when the sliding unit 15 and the end section of the first tubular member 2 are pushed forwards in relation to the base unit 14 by means of the stroking device 16.

Different steps in a process of connecting an end of a first tubular member 2 to an end of a second tubular member 3 by means of a subsea arrangement 1 of the embodiment described above are illustrated in FIGS. 3-7.

Figure 3:
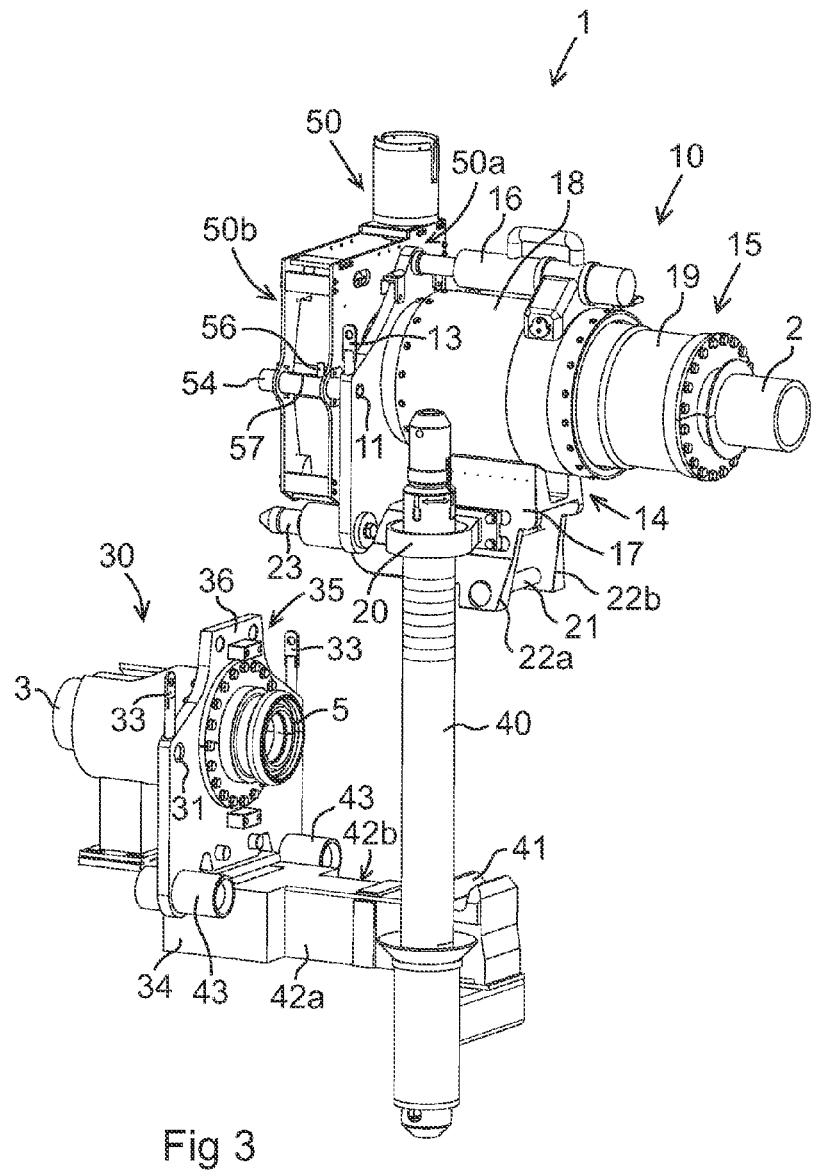
FIGS. 3, 4, 5, and 6 are perspective views illustrating different steps in a process of connecting the end sections of two conduits to each other by means of the clamp connector and subsea structure of FIG. 1 and a second subsea structure according to embodiments of the present invention.
Figure 4:
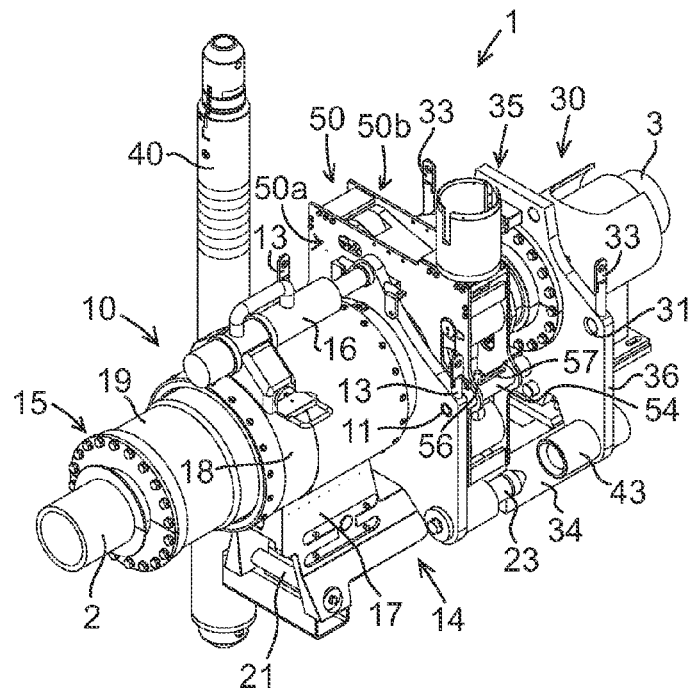
Figure 5:
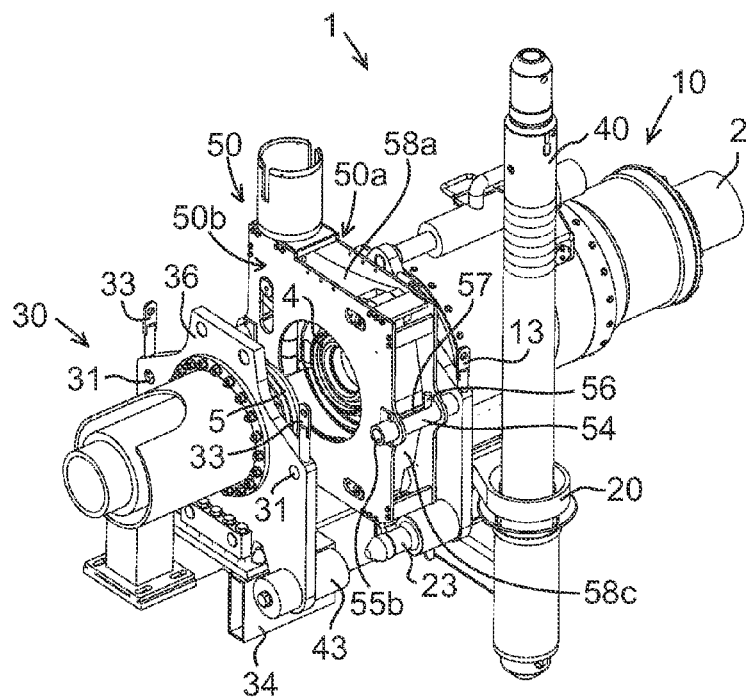
Figure 6:
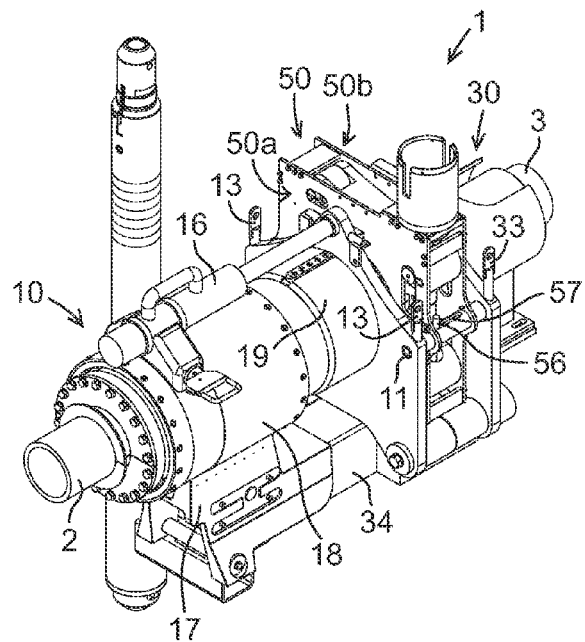
Figure 7:
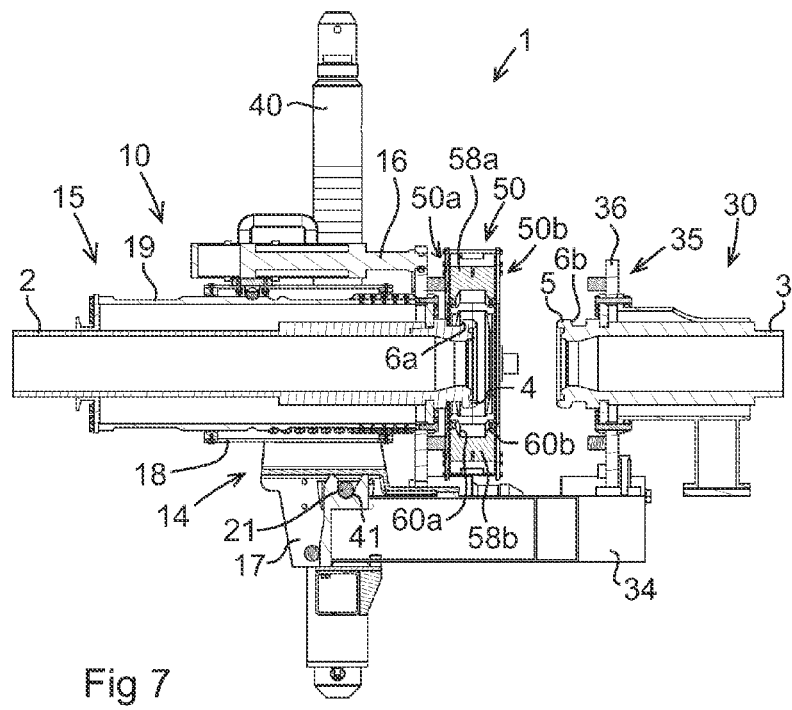
FIG. 7 is a longitudinal section through the clamp connector and the first and second subsea structures in a position corresponding to the position illustrated in FIGS. 4 and 5 according to an embodiment of the present invention.
Figure 10:
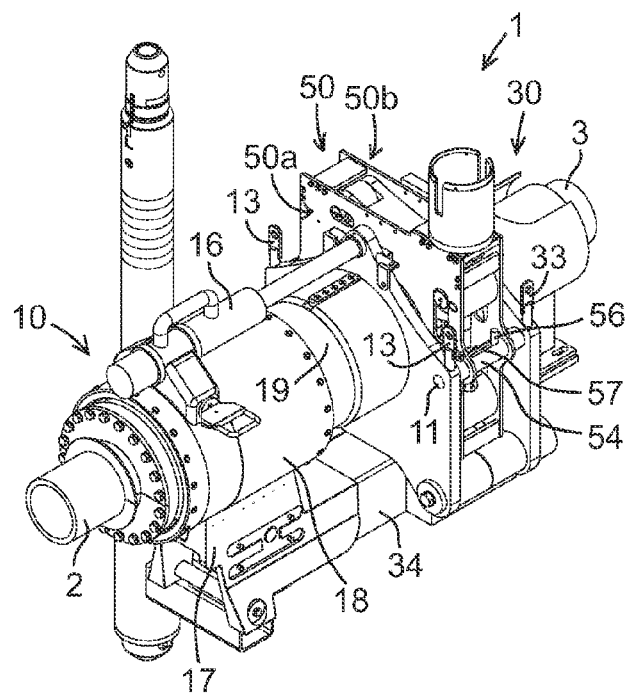
FIGS. 10 and 11 are perspective views illustrating different steps in a process of transferring the clamp connector from the first subsea structure to the second subsea structure and disconnecting the end sections of the two conduits from each other according to embodiments of the present invention.

In an embodiment, the second subsea structure 30 mounted to a subsea foundation (not shown) and the end section of the second tubular member 3 fixed to the holding unit 35 of the second subsea structure. In an embodiment, the clamp connector 50 and the end section of the first tubular member 2 are secured to the sliding unit 15 of the first subsea structure 10 before the first subsea structure is lowered into the sea. Thus, the coupling members 51a on the first side 50a of the clamp connector 50 are in engagement with and locked to the corresponding coupling members 11 on the first subsea structure 10 in order to keep the clamp connector secured to the sliding unit 15 of the first subsea structure 10. The stroking device 16 may also be secured to the sliding unit 15 and the base unit 14 of the first subsea structure 10 before the first subsea structure is lowered into the sea. The first subsea structure 10 is lowered into the sea, e.g. from a surface vessel, while hanging in a crane hook of a hoisting device through lifting wires (not shown) attached to the first subsea structure 10. A guide line (not shown) attached to the upper end of the guide post 40 of the second subsea structure 30 will assist the guiding to ensure that the ring-shaped guide member 20 of the base unit 14 will be properly engaged with the guide post 40, as illustrated in FIG. 3, The first subsea structure 10 is lowered further downwards while being guided along the guide post 40 until the guide members 21, 22a, 22b on the base unit 14 of the first subsea structure 10 come into engagement with the corresponding guide members 41, 42a, 42b on the second subsea structure 30 and until the base frame 17 included in the base unit 14 of the first subsea structure comes to bear against the base frame 34 of the second subsea structure 30, as illustrated in FIGS. 4, 5 and 7. Thereafter, the stroking device 16 is actuated to push the sliding unit 15 forwards in relation to the base unit 14 so to move the end of the first tubular member 2 and the clamp connector 50 from the position illustrated in FIGS. 4, 5 and 7 to the position illustrated in FIG. 6. The hub 4 of the first tubular member 2 is thereby brought into contact with the hub 5 of the second tubular member 3. A remotely operated torque tool (not shown), which is detachably mounted to the clamp connector 50, is then operated to pivot the clamping elements 58a, 58b from the open position to the closed position, so as to clamp together the hub 4 of the first tubular member 2 and the hub 5 of the second tubular member 3. The stroking tool 16 may then be retrieved to the surface vessel together with the torque tool and the guide post 40, if so desired.

In an embodiment, the clamp connector 50 may be secured to the second subsea structure 30 before the first subsea structure 10 is lowered into the sea and brought into engagement with the second subsea structure.

Figure 11:
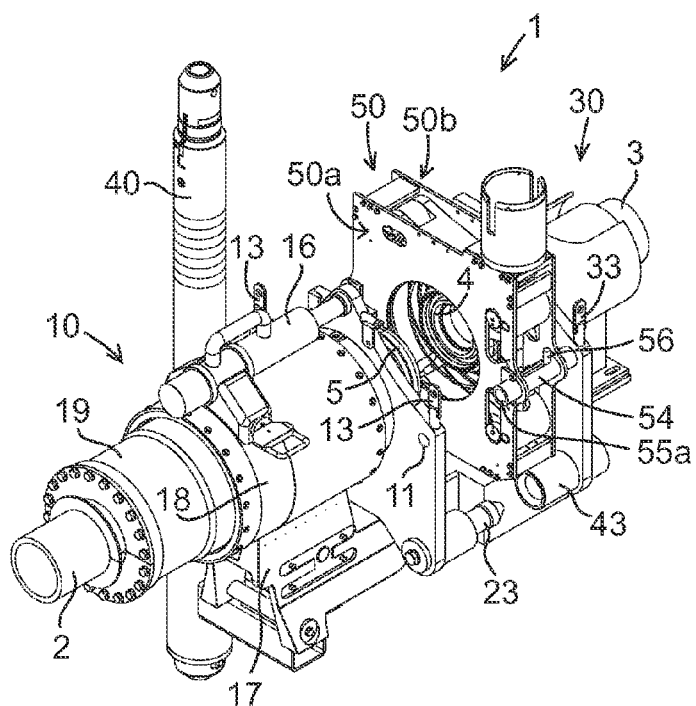

If the first subsea structure 10 needs to be retrieved to a surface vessel at a later moment without the clamp connector 50, in an embodiment, the clamp connector 50 can be released from the first subsea structure 10 and secured to the second subsea structure 30. In such a case, the locking member 12 of each coupling member 11 on the first subsea structure 10 is moved from the locking position to the unlocking position by means of an ROV acting on the handles 13. Thereafter, the coupling members 51a, 51b on the clamp connector 50 are moved from the positions illustrated in FIGS. 8A and 9A to the positions illustrated in FIGS. 8b and 9B by means of an ROV acting on the control members 56, whereupon the locking member 32 of each coupling member 31 on the second subsea structure 30 is moved from the unlocking position to the locking position by means of an ROV acting on the handles 33. The clamp connector 50 is thereby secured to the second subsea structure 30 and the first subsea structure 10 may then be released from the clamp connector, as illustrated in FIG. 11, when the clamping elements 58a, 58b have been pivoted from the closed position to the open position.

The invention is, of course, not in any way restricted to the embodiments described above. On the contrary, many possibilities to modifications thereof will be apparent to a person with ordinary skill in the art without departing from the basic idea of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural element with insubstantial differences from the literal languages of the claims.

What is claimed is:

1. A subsea arrangement comprising:
a first subsea structure;
a second subsea structure; and
a clamp connector for connecting and securing an end of a tubular member that is fixed to the first subsea structure to an abutting end of another tubular member that is fixed to the second subsea structure, the clamp connector comprising a first side facing the first subsea structure, a second side opposite to the first side and facing the second subsea structure, a first clamping element comprising a hinged first end and an opposite second end, a second clamping element comprising a hinged first end and an opposite second end, and an operating shaft connected to the first and the second clamping elements, wherein the operating shaft is moveable by an actuating tool in order to move the second ends of the clamping elements towards each other and thereby pivot the clamping elements into engagement with the ends of the tubular members;
the first subsea structure comprising at least one first coupling member configured to mate with at least one first corresponding coupling member on the first side of the clamp connector, wherein the clamp connector is configured to be releasably connected and secured to the first subsea structure through the at least one first coupling member and the at least one first corresponding coupling member; and the second subsea structure comprising at least one second coupling member configured to mate with at least one second corresponding coupling member on the second side of the clamp connector, wherein the clamp connector is configured to be releasably connected and secured to the second subsea structure through the at least one second coupling member and the at least one second corresponding coupling member;
wherein each of the at least one first coupling member on the first subsea structure comprises a locking member configured to engage with a corresponding locking member on the at least one first corresponding coupling member to releasably retain the at least one first coupling member and the at least one first corresponding coupling member in engagement with each other, wherein the locking member is configured to be rotated between locking and unlocking positions; and
wherein each of the at least one second coupling member on the second subsea structure comprises a locking member configured to engage with a corresponding locking member on the at least one second corresponding coupling member to releasably retain the at least one second coupling member and the at least one second corresponding coupling member in engagement with each other, wherein the locking member is configured to be rotated between locking and unlocking positions.

2. The subsea arrangement according to claim 1, wherein:
the at least one first corresponding coupling member comprises at least two first corresponding coupling members provided on the first side of the clamp connector on opposite sides of a vertical central plane of the clamp connector, each one of the at least two coupling members configured to mate with a corresponding coupling member on the first subsea structure; and
the at least one second corresponding coupling member comprises at least two second corresponding coupling members provided on the second side of the clamp connector on the opposite sides of the vertical central plane of the clamp connector, each one of the at least two second corresponding coupling members configured to mate with a corresponding coupling member on the second subsea structure.

3. The subsea arrangement according to claim 1, wherein each of the at least one first coupling member on the first subsea structure is a female-like coupling member, and each of the at least one first corresponding coupling member on the first side of the clamp connector is a male-like coupling member configured to fit into the female-like coupling member.

4. The subsea arrangement according to claim 3, wherein each of the male-like coupling members has the form of a horizontally extending pin.

5. The subsea arrangement according to claim 3, wherein each of the male-like coupling members is moveably mounted to the clamp connector, wherein the clamp connector is configured to move between an advanced position for engagement with the female-like coupling member and a retracted position for disengagement from the female-like coupling member.

6. The subsea arrangement according to claim 5, wherein the male-like coupling members are arranged in pairs, each of the pairs comprising a first male-like coupling member provided on the first side of the clamp connector and a second male-like coupling member provided on the second side of the clamp connector, wherein the first and the second coupling members in each pair are fixed to and extend in opposite directions from a body displaceably mounted to the clamp connector, the body displaceable to and fro between a first position, in which the first male-like coupling member is in its advanced position and the second male-like coupling member is in its retracted position, and a second position, in which the second male-like coupling member is in its advanced position and the first male-like coupling member is in its retracted position.

7. The subsea arrangement according to claim 6, wherein:
the body is slidably received in a tubular casing extending between the first and the second sides of the clamp connector;
the first male-like coupling member extends through an opening at a first end of the tubular casing when the first male-like coupling member is in its advanced position, and is received inside the tubular casing when the first male-like coupling member is in its retracted position; and
the second male-like coupling member extends through an opening at the second end, opposite to the first end, of the tubular casing when the second male-like coupling member is in its advanced position, and is received inside the tubular casing when the second male-like coupling member is in its retracted position.

8. The subsea arrangement according to claim 1, wherein each of the at least one second coupling member on the second subsea structure is a female-like coupling member, and each of the at least one second corresponding coupling member on the second side of the clamp connector is a male-like coupling member configured to fit into the female-like coupling member.

* * * * *